(12) United States Patent
Oh et al.

(10) Patent No.: US 7,419,737 B2
(45) Date of Patent: Sep. 2, 2008

(54) FUEL SUPPLY DEVICE FOR DIRECT METHANOL FUEL CELLS

(75) Inventors: Jung-min Oh, Yongin-si (KR); Hye-jung Cho, Anyang-si (KR); Kyoung-hwan Choi, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 702 days.

(21) Appl. No.: 10/932,298

(22) Filed: Sep. 2, 2004

(65) Prior Publication Data

US 2005/0069736 A1     Mar. 31, 2005

(30) Foreign Application Priority Data

Sep. 5, 2003     (KR) ................. 10-2003-0062246

(51) Int. Cl.
*H01M 2/00* (2006.01)
*F01N 3/20* (2006.01)

(52) U.S. Cl. .............. 429/34; 429/32; 429/50; 429/39; 422/103; 48/127.3

(58) Field of Classification Search ............... 48/127.3; 429/34, 50, 32, 39; 422/103
See application file for complete search history.

(56) References Cited

U.S. PATENT DOCUMENTS

| | | | |
|---|---|---|---|
| 4,463,068 A * | 7/1984 | Cohn et al. ............ | 429/34 |
| 4,562,123 A | 12/1985 | Shimizu et al. | |
| 5,759,712 A * | 6/1998 | Hockaday ............ | 429/30 |
| 6,506,513 B1 * | 1/2003 | Yonetsu et al. ......... | 429/34 |
| 6,994,932 B2 * | 2/2006 | Kinkelaar et al. ....... | 429/34 |
| 7,147,950 B2 * | 12/2006 | Yonetsu et al. ......... | 429/25 |
| 2001/0051293 A1 | 12/2001 | Narayanan et al. | |
| 2003/0059659 A1 * | 3/2003 | Kamo et al. ........... | 429/32 |

FOREIGN PATENT DOCUMENTS

| | | | |
|---|---|---|---|
| EP | 0107396 | * | 5/1984 |
| EP | 1 087 455 | | 3/2001 |
| EP | 1 296 400 | | 3/2003 |
| JP | 2000-268836 | | 9/2000 |

OTHER PUBLICATIONS

Patent Abstracts of Japan, vol. 2000, No. 12, Jan. 3, 2001 (&/= JP 2000-268836—Sept. 29, 2000).

* cited by examiner

*Primary Examiner*—N. Bhat
(74) *Attorney, Agent, or Firm*—Lee & Morse, P.C.

(57) ABSTRACT

A fuel supply device for direct methanol fuel cells includes a fuel tank for storing liquid fuel, a wick structure formed on the fuel tank, the wick structure for receiving the liquid fuel from the fuel tank, a sheet stack disposed on the wick structure, the sheet stack for absorbing and transferring, in an upward direction, the liquid fuel supplied to the wick structure, and an electrode plate disposed on the sheet stack for supplying, in an upward direction, the liquid fuel absorbed into the sheet stack. The fuel supply device may continuously and uniformly supply a proper amount of liquid fuel and effectively remove by-products generated in a fuel cell. Thus, a long life, efficient fuel cell may be created with the fuel supply device.

18 Claims, 10 Drawing Sheets

FUEL SUPPLY DEVICE FOR DIRECT METHANOL FUEL CELLS

BACKGROUND OF THE INVENTION

1. Field of the Invention

The present invention generally relates to a fuel supply device for direct methanol fuel cells. More particularly, the present invention relates to a fuel supply device for direct methanol fuel cells including a wick structure and a sheet stack. A fuel supply device of the present invention may provide a continuous and uniform supply of liquid fuel in a proper amount and effectively remove by-products.

2. Description of the Related Art

To meet recent demands for portable, small, light-weight electronic equipment, fuel cells are attracting public attention as a battery for electronic equipment. Fuel cells, having a higher energy density than secondary cells, are advantageously used in small, light-weight, electronic equipment. Also, since fuel cells can supply energy to electronic equipment for a long period of time with a single fuel supply, they are suitable for use in portable equipment. Further, fuel cells produce only carbon dioxide and water as by-products. Therefore, fuel cells do not cause air pollution and are environmentally friendly energy sources.

Fuel cells are classified by electrolytes contained in the cells, including, for example, phosphoric acid fuel cells (PAFC), alkaline fuel cells (AFC), polymer electrolyte fuel cells (Proton Exchange Membrane Fuel Cell, PEMFC), molten carbonate fuel cells (MCFC), solid oxide fuel cells (SOFC), and direct methanol fuel cells (DMFC).

Fuel cells generate energy by chemical reactions. For example, a chemical reaction of hydrogen ions and oxygen produces heat and water. The heat generated is converted into electric energy and supplied to electronic equipment. However, if hydrogen is used as a fuel, a fuel tank having a relatively large volume is needed. Also, if highly pressurized hydrogen is used to reduce the volume of the fuel tank, a high pressure fuel storing system is needed, which, for safety reasons, is not suitable for use in portable electronic equipment.

Since direct methanol fuel cells use liquid fuel as a hydrogen supply source, direct methanol fuel cells can store much more hydrogen than if hydrogen gas were being stored. Also, direct methanol fuel cells have an advantage in that they may be used for a longer period of time than conventional secondary cells. Further, because direct methanol fuel cells may be readily recharged, they are suitable for use in portable electronic equipment.

Figure 1:
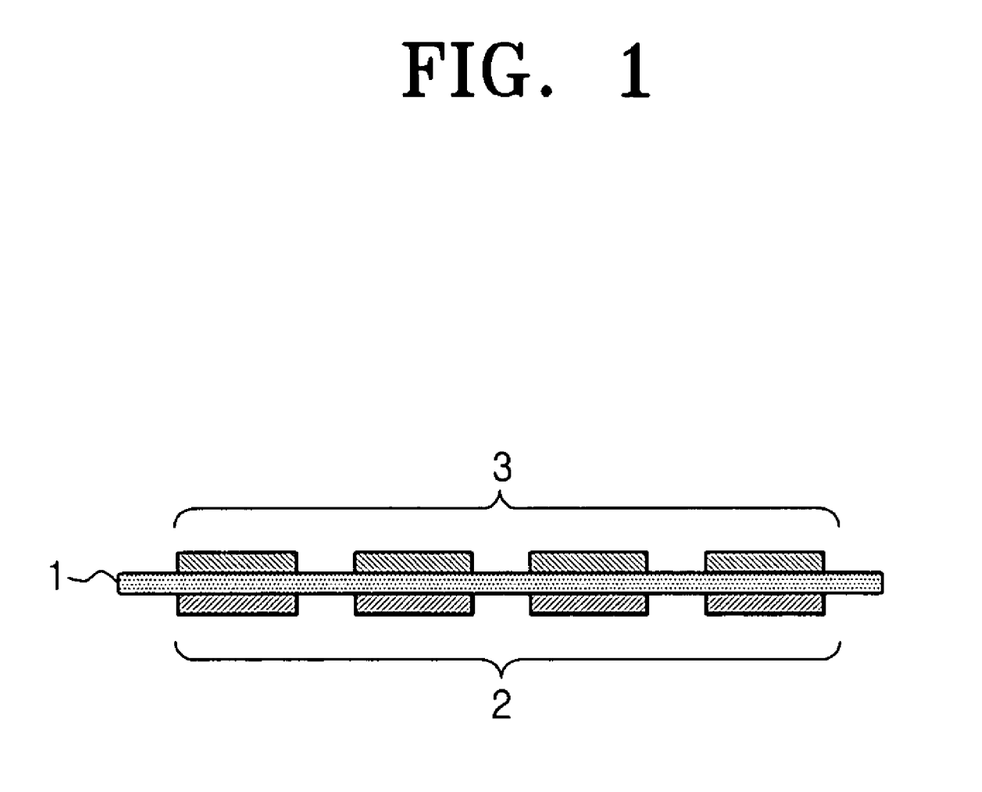
FIG. 1 is a schematic illustrating a related direct methanol fuel cell.

As shown in FIG. 1, a direct methanol fuel cell includes a membrane electrode assembly, which includes an anode 2, a membrane 1 and a cathode 3. Reactions occurring in anodes and cathodes of direct methanol fuel cells are shown in the following Reaction Scheme (I).

Reaction Scheme I

Anode: $CH_3OH + H_2O = CO_2 + 6H^+ + 6e^-$
Cathode: $1.5O_2 + 6H^+ + 6e^- = 3H_2O$
Total: $CH_3OH + 1.5O_2 = CO_2 + H_2O$, $E_0 = 1.18$ V When methanol is used as a liquid fuel, a methanol cross-over phenomenon occurs, whereby highly concentrated methanol passes through the membrane of a fuel cell without ionization. Such a cross-over phenomenon may cause efficiency of the fuel cell to deteriorate, since the supplied fuel is consumed without participating in the reaction. Therefore, in order to reduce the cross-over phenomenon, methanol is diluted with water in a proper ratio to control the concentration of methanol in the liquid fuel at a predetermine level, before being supplied. However, since water mixed with methanol is surplus moisture and is not needed for the chemical reaction to generate energy, it should be smoothly discharged off to improve the efficiency of the fuel cell. Also, the carbon dioxide generated as a by-product of the chemical reaction should be effectively removed from the membrane. Otherwise, the chemical reaction in the fuel cell is hindered by the carbon dioxide and the fuel cell efficiency reduced.

Therefore, there is a demand for a fuel supply device that continuously supplies a proper amount of liquid fuel to direct methanol fuel cells and effectively removes carbon dioxide and water generated in the fuel cells.

A related solution provides a fuel supply device including a wick structure to supply liquid fuel to an anode of a fuel cell through the capillary phenomenon between the fuel cell and a fuel storing tank. However, this fuel cell device solve the problem associated with the methanol cross-over phenomenon, since the anode is in contact with the liquid fuel through the wick structure, whereby an excessive amount of the liquid fuel is supplied in a short time. Also, this fuel cell device cannot effectively remove carbon dioxide and water generated as by-products in the fuel cell, causing deterioration of the efficiency of the fuel cell.

In addition, some passive fuel supply devices using a porous medium are known. Fuel cells employing these passive fuel supply devices using a porous medium are largely affected by the performance of the porous medium in terms of fuel cell efficiency. The porous medium transports and supplies a liquid fuel from a fuel tank to the fuel cell by capillary force through direct contact with an anode of the fuel cell. Therefore, quality of the porous medium is determined by porosity and pore size distribution. If the pore size distribution of the porous medium is large, it is difficult to uniformly supply liquid fuel to an electrode surface and to remove by-products such as carbon dioxide and vapor. When transportation of liquid fuel to the membrane through the electrode is hindered due to carbon dioxide and vapor, the efficiency of the fuel cell is hastily deteriorated and fuel leakage may occur.

SUMMARY OF THE INVENTION

The present invention is therefore directed to a fuel supply device for direct methanol fuel cells, which substantially overcomes one or more of the problems due to the limitations and disadvantages of the related art.

Accordingly, it is a feature of an embodiment of the present invention to provide a fuel supply device for direct methanol fuel cells including a liquid fuel supply system, which includes a wick structure and a sheet stack.

It is another feature of an embodiment of the present invention to provide a fuel supply device for direct methanol fuel cells that continuously and uniformly supplies a proper amount of liquid fuel and effectively removes by-products from the liquid fuel, to thereby improve efficiency of the fuel cells.

At least one of the above and other features and advantages of the present invention may be realized by providing a fuel supply device for direct methanol fuel cells, including a fuel tank for storing liquid fuel, a wick structure formed on the fuel tank, the wick structure receiving the liquid fuel from the fuel tank, a sheet stack disposed on the wick structure, the sheet stack for absorbing and transferring, in an upward direction, the liquid fuel supplied to the wick structure, and an electrode plate disposed on the sheet stack, the electrode plate for supplying, in an upward direction, the fuel absorbed into the sheet stack.

The fuel tank may be capable of being attached to and detached from the wick structure. The fuel tank may include a fuel tank body and a porous medium. The porous medium may be disposed inside the fuel tank body and may extend beyond the fuel tank body.

The wick structure may include a wick structured plate having a plurality of wicks and fuel supply ports. The porous medium may be disposed corresponding to the fuel supply ports of the wick structured plate. The plurality of wicks of the wick structured plate may be arranged in at least two parallel horizontal rows. However, the plurality of wicks arranged in the at least two parallel horizontal rows may be staggered in a vertical direction. The plurality of wicks may be arranged radially outward from a center of the wick structured plate. The wick structured plate may further include a wall formed on edges thereof.

The sheet stack may include at least two sheets, which are stacked, and each sheet may include pattern parts having a linear pattern formed thereon and channels parallel to a longitudinal direction of the pattern parts, and directions of the linear patterns of the pattern parts of adjacent sheets may be perpendicular to each other. The pattern parts and channels of the sheets may be respectively superposed on the pattern parts and channels of adjacent sheets. The channels of each sheet may have at least one end open at a side of the respective sheet. Areas of the pattern parts of the sheets may be smaller in sheets disposed increasingly further from the wick structure. However, widths of the channels of the sheets may be larger in sheets disposed increasingly further from the wick structure The electrode plate may include pattern parts and channels respectively formed at positions superposed on pattern parts and channels of an uppermost sheet of the sheet stack disposed therebelow, and a linear pattern of the pattern parts of the electrode plate may correspond to the linear pattern of a second uppermost sheet of the sheet stack.

The pattern parts of the sheets of the sheet stack may, together, form a mesh structure. The mesh structure may have micro-holes.

Each sheet of the sheet stack may further include fuel inlets formed at positions corresponding to the fuel supply ports of the wick structure.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 2003-62246, filed on Sep. 5, 2003, in the Korean Intellectual Property Office, and entitled: "Fuel Supply Device For Direct Methanol Fuel Cells," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

Figure 2A:
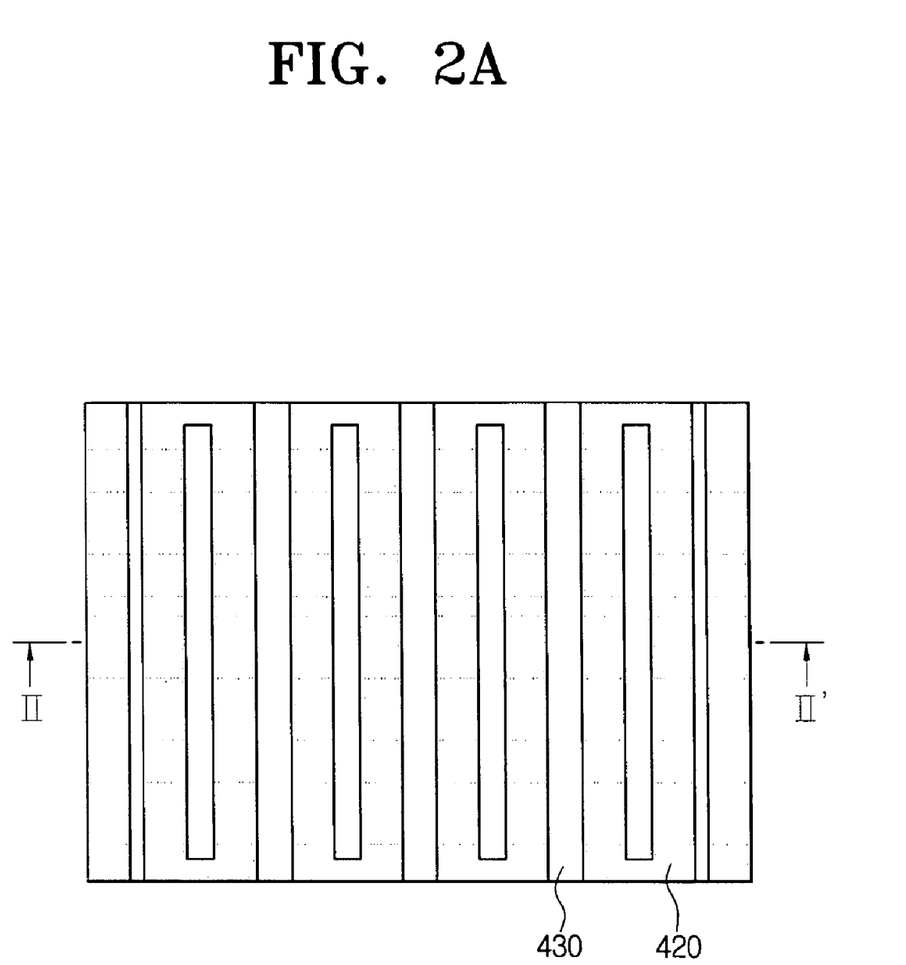
FIG. 2A is a schematic illustrating a fuel supply device for direct methanol fuel cells according to an embodiment of the present invention.
Figure 2B:
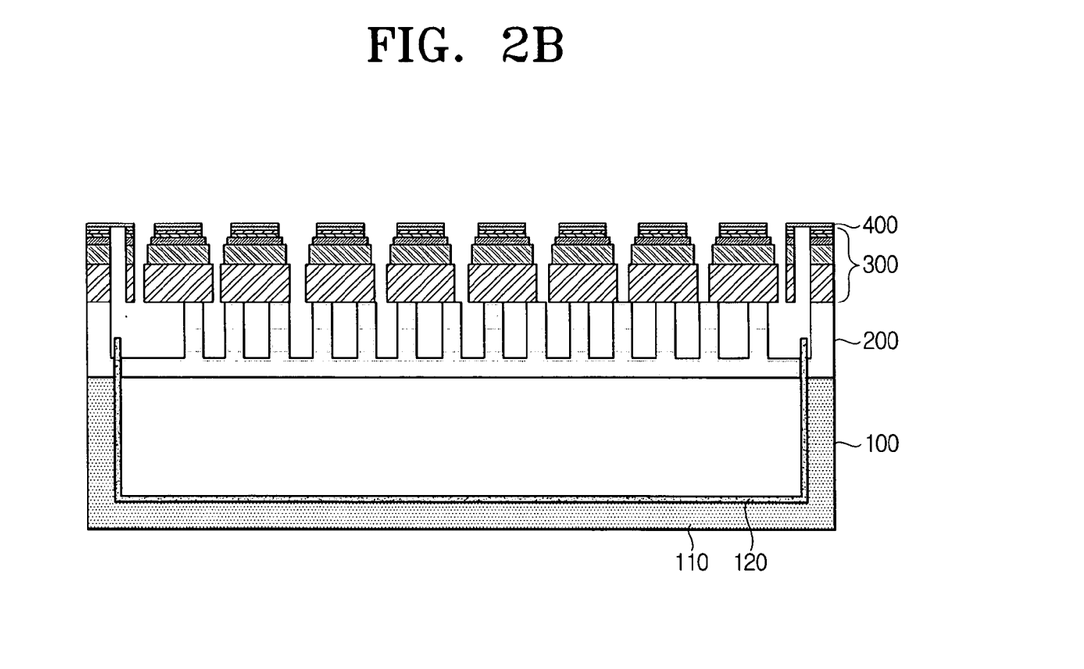
FIG. 2B illustrates a cross-section taken along line II-II' of FIG. 2A.

FIG. 2A illustrates a plan view of a fuel supply device for direct methanol fuel cells according to an embodiment of the present invention. FIG. 2B illustrates a cross-section taken along line II-II' of FIG. 2A.

Referring to FIG. 2B, the fuel supply device for direct methanol fuel cells according to an embodiment of the present invention includes a fuel tank 100, a wick structured plate 200, a sheet stack 300 and an electrode plate 400, which are sequentially deposited.

The fuel tank 100 for storing liquid fuel includes a fuel tank body 110 and a porous medium 120. The fuel tank 100 may be detached from and attached onto the wick structured plate 200, which is disposed thereon.

The fuel tank 100 may be formed of a fuel tank body 110 alone, but may include the porous medium 120. The porous medium 120 may be formed of a foam body, bundled fiber, matted fiber, woven fiber, non-woven fiber or inorganic porous material, but is not limited thereto. The porous medium 120 is disposed inside the fuel tank body 110 and may extend beyond the fuel tank body 110. Porosity of the porous medium 120 allows liquid fuel stored in the fuel tank body 110 to be absorbed by capillary force. The liquid fuel is transferred along the porous medium 120 to the wick structured plate 200, which is disposed on the fuel tank body 110.

The fuel tank 100, having the wick structured plate 200 disposed thereon, may be attached onto and detached from the wick structured plate 200. Therefore, when the liquid fuel stored in the fuel tank body 110 is consumed, the fuel tank 100 may be detached from the wick structured plate 200, re-supplied with liquid fuel, and re-attached to the wick structured plate 200. Thus, the fuel tank 100 may be repeatedly recharged with liquid fuel, thereby allowing the fuel supply device to be used semi-permanently. The fuel tank 100 may further include a fuel inlet (not shown) formed in the fuel tank body 110 for recharging the fuel tank body 110 with liquid fuel.

Figure 2C:
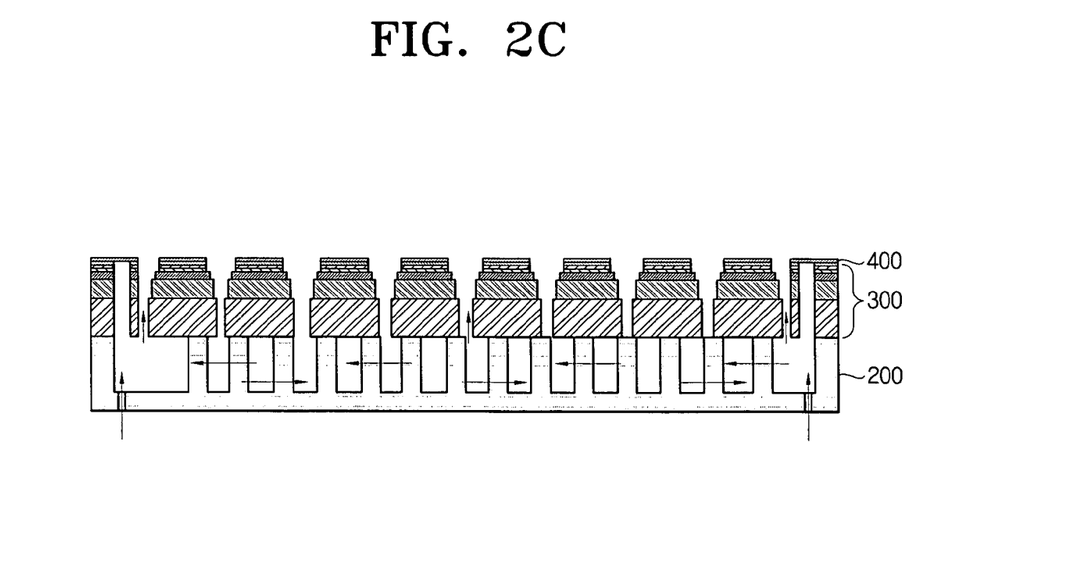
FIG. 2C illustrates a cross-section showing a formation in which a fuel tank of FIG. 2B is detached.

FIG. 2C illustrates a structure of an upper part of the fuel supply device shown in FIG. 2B, but without the fuel tank 100. Referring to FIG. 2C, the liquid fuel transferred through a fuel supply port (not shown) of the wick structured plate 200 is spread throughout the wick structured plate 200. Then, the liquid fuel is transferred in an upward direction through the sheet stack 300, which is disposed on the wick structured plate 200.

Figure 3:
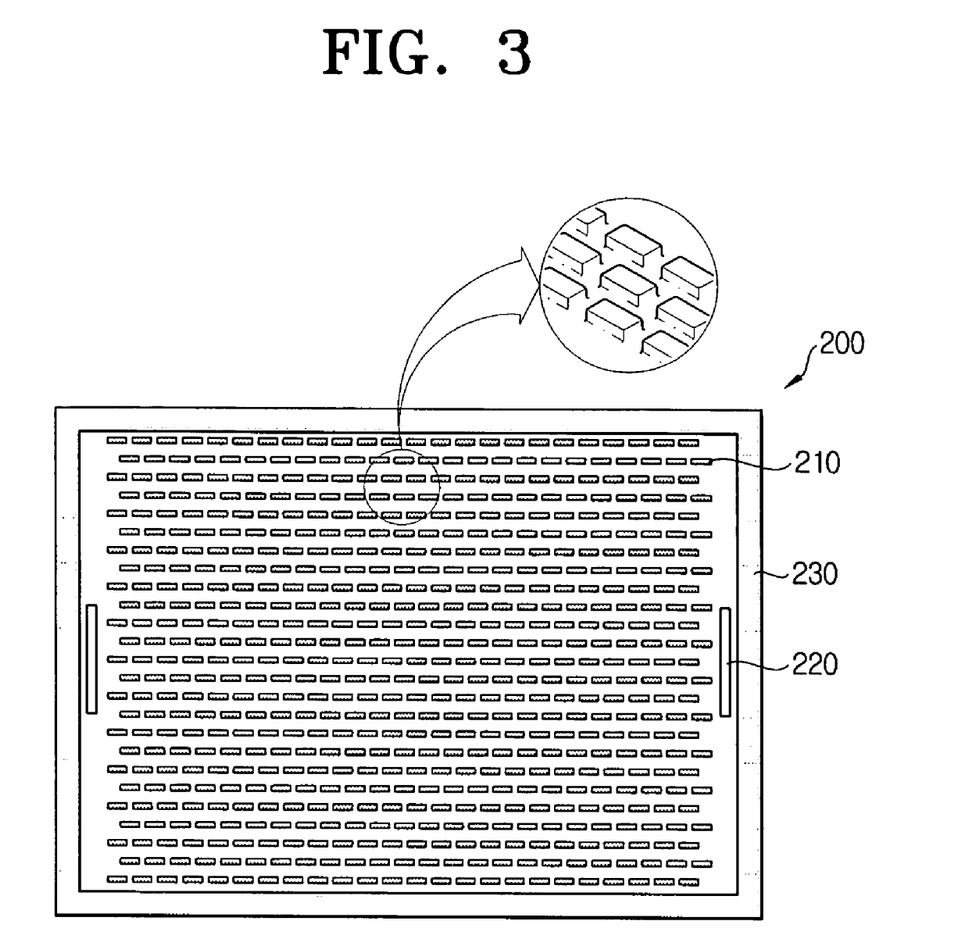
FIG. 3 illustrates a plan view showing a wick structured plate of FIG. 2B.

FIG. 3 illustrates a detailed plan view of the wick structured plate 200 shown in FIGS. 2B and 2C. Referring to FIG. 3, the wick structured plate 200 includes a plurality of micro-wicks 210 and a pair of fuel supply ports 220 having the plurality of micro-wicks 210 positioned therebetween. Each one of the pair of fuel supply ports 220 is vertically parallel to the other, and edges of the wick structured plate 200 are provided with a wall 230.

A partially enlarged view of the wicks 210 is shown in the circular detail view of FIG. 3. Each of the plurality of wicks 210 is formed as a protrusion on the wick structured plate 200. Although the plurality of wicks 210 may be formed randomly, forming the plurality of wicks 210 at regular intervals may allow the liquid fuel to be uniformly spread throughout the wick structured plate 200. As shown in FIG. 3, the plurality of wicks 210 may be arranged in horizontal rows on the wick structured plate 200, in which the horizontal rows are perpendicular to the fuel supply ports 220. There may be at least two horizontal rows of wicks 210, and the horizontal rows may be parallel to each other. For uniform spread of the liquid fuel, when the plurality of wicks 210 are formed in parallel horizontal rows, the plurality of wicks 210 may be staggered in a vertical direction. In other words, vertical rows, i.e., "columns", of the plurality of wicks 210 may be staggered, such that the columns in the vertical direction are not parallel to each other, but rather individual wicks thereof may overlap individual wicks of an adjacent column in the vertical direction.

Although not shown in FIG. 3, the plurality of wicks may be disposed in a radial arrangement from the center of the wick structured plate, to form a plurality of concentric circles.

FIGS. 4A through 4E illustrate plan views of sheets forming the sheet stack 300 of FIGS. 2A and 2B. Each sheet is sequentially deposited to form the sheet stack 300. Although five sheets are shown in FIGS. 4A through 4E, the sheet stack may be formed of two or more laminated sheets.

Figure 4A:
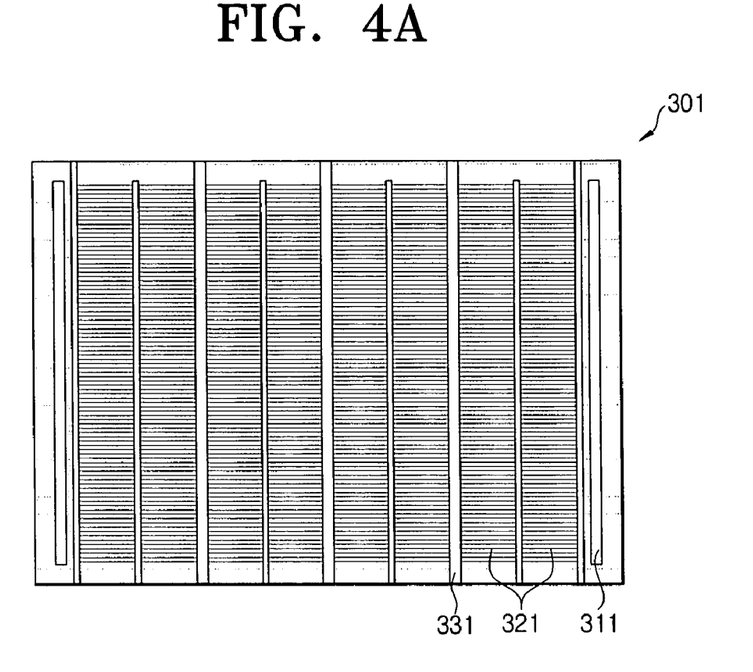
FIGS. 4A through 4E illustrate plan views showing respective sheets forming a sheet stack of FIG. 2B.

Referring to FIG. 4A, a first sheet 301 includes fuel inlets 311 formed at positions corresponding to the fuel supply port of the wick structured plate formed below, pattern parts 321 having a first directional linear pattern formed thereon, and channels 331 formed between adjacent pattern parts 321. The channels 331 may be parallel to a longitudinal direction of the pattern parts 321. Each channel 331 may have at least one of both ends opened at a side of the sheet 301.

Figure 4B:
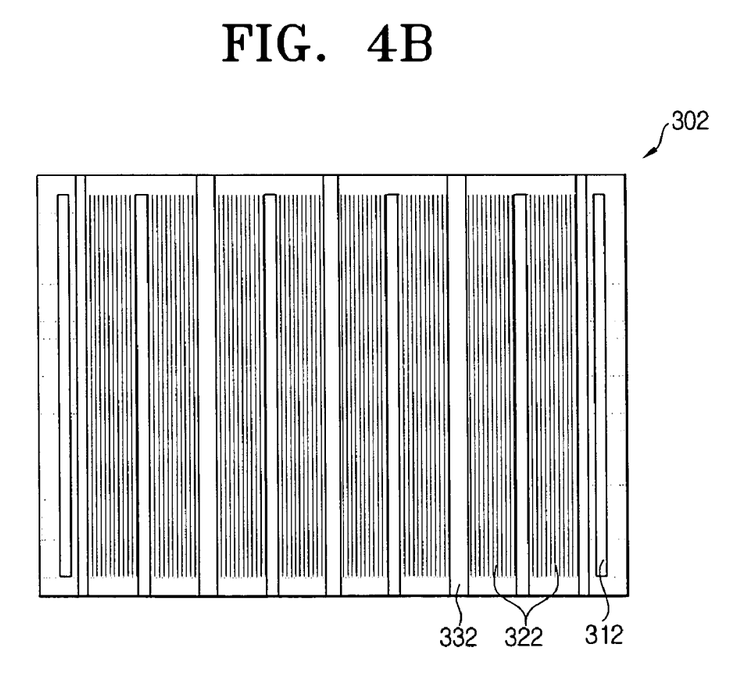

Referring to FIG. 4B, a second sheet 302 includes fuel inlets 312 formed at positions corresponding to the fuel inlets 311 of the first sheet 301 formed below, pattern parts 322 having a second directional linear pattern and which are superposed on the pattern parts 321 of the first sheet 301, and channels 332 formed between adjacent pattern parts 322 at positions superposed on the channels 331 of the first sheet 301. The first directional linear pattern and the second directional linear pattern may be perpendicular to each other.

Figure 4C:
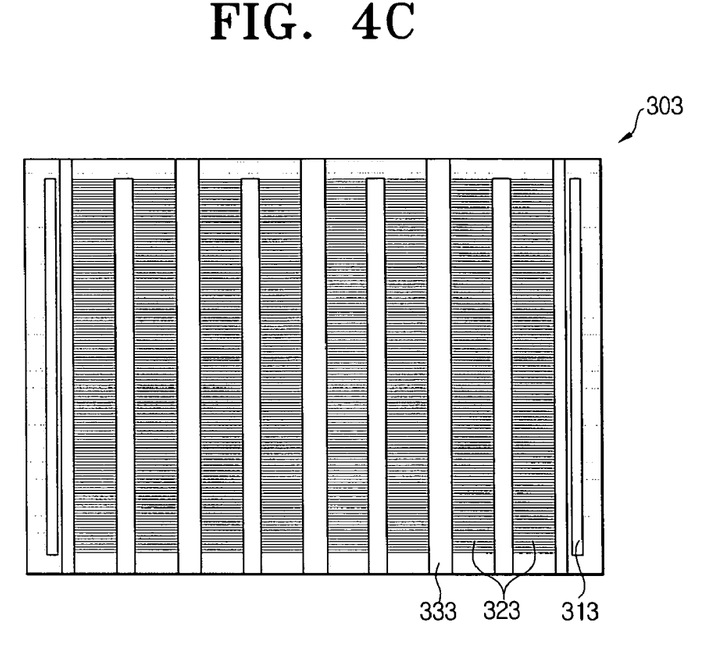
Figure 4D:
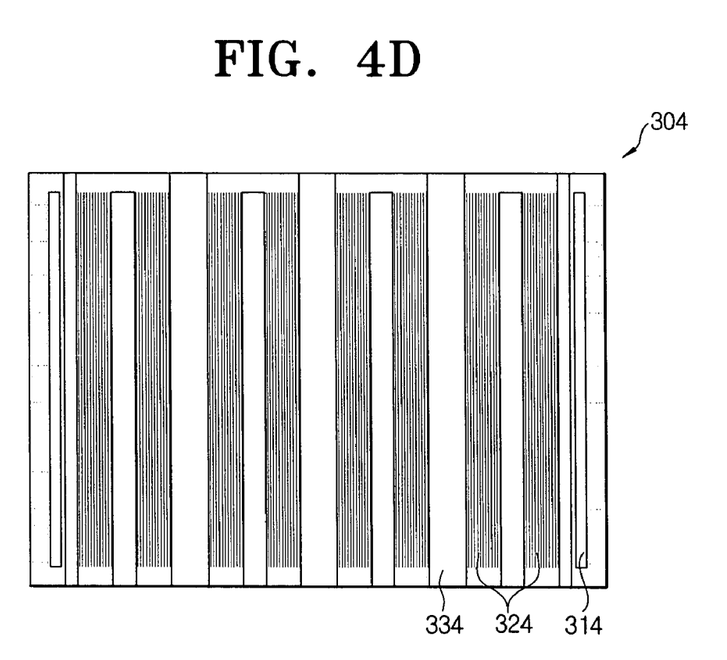
Figure 4E:
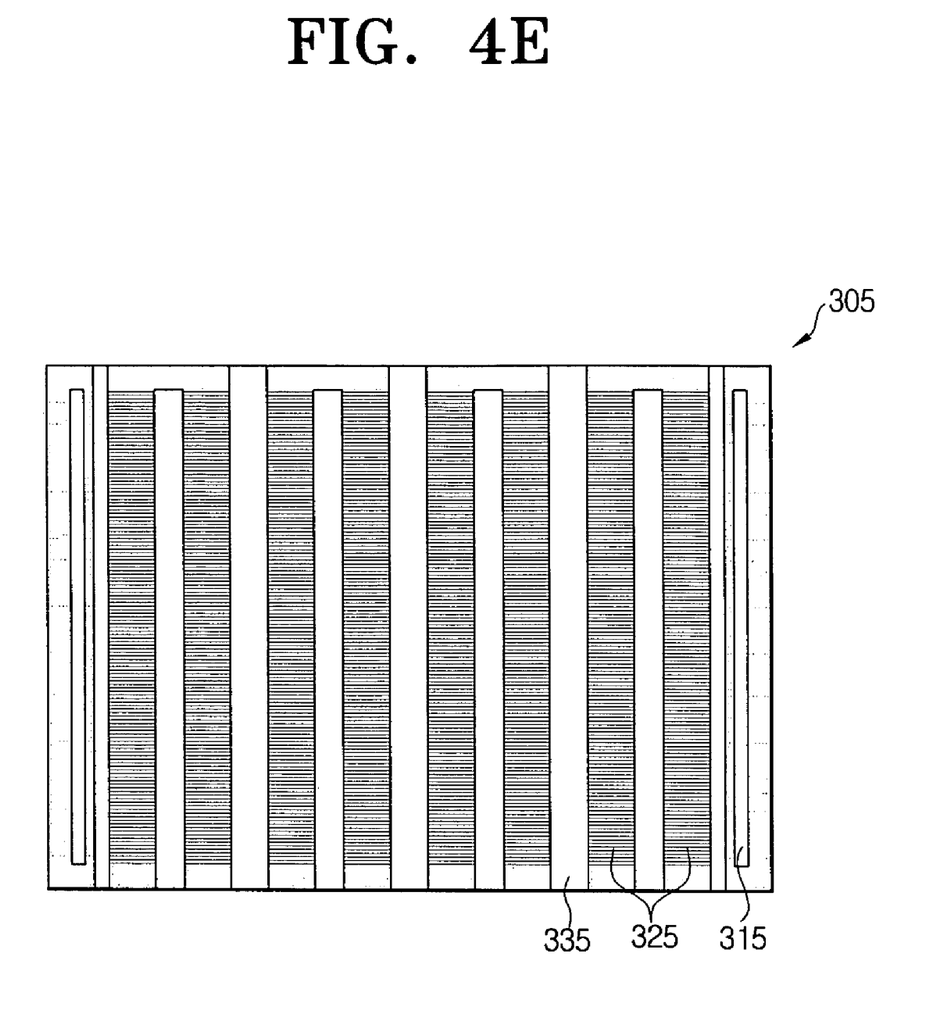

Similar to FIGS. 4A and 4B, FIGS. 4C through 4E illustrate plan views of a third sheet 303, a fourth sheet 304, and a fifth sheet 305, respectively. Referring to FIGS. 4C through 4E, the third sheet 303, the fourth sheet 304, and the fifth sheet 305 include, respectively, fuel inlets 313, 314, 315, pattern parts 323, 324, 325, and channels 333, 334, 335. The fuel inlets 313, 314, 315, pattern parts 323, 324, 325, and channels 333, 334, 335 may be respectively formed at positions superposed on the fuel inlets 311, 312, pattern parts 321, 322, and channels 331, 332 of the first sheet 301 and the second sheet 302, respectively. The pattern parts 323, 325 of the third sheet 303 and the fifth sheet 305 may have a linear pattern in the first direction formed thereon and the pattern part 324 of the fourth sheet 304 may have a linear pattern in the second direction formed thereon.

Referring to FIGS. 4A through 4E, the sheets 301, 302, 303, 304, 305 are sequentially disposed on each other to form the sheet stack 300 of FIGS. 2A and 2B. Areas of the pattern parts 321, 322, 323, 324, 325 of the respective sheets, which are superposed on each other, may be respectively smaller in each sheet disposed on the sheet stack 300. That is, an area of the pattern parts of each sheet may be smaller in sheets disposed at increasingly higher positions of the sheet stack. Conversely, an area and a width of the channels 331, 332, 333, 334, 335 of the respective sheets, which are superposed on each other, may increase in sheets disposed at increasingly higher positions of the sheet stack. A cross-section of the sheet stack shows the channels as a funnel due to the increase in channel area in an upward direction.

Exemplary operation of a fuel cell and a fuel supply device according to the present invention will now be described. A fuel cell is formed on the fuel supply device. Energy is generated by chemical reactions occurring in the fuel cell, and carbon dioxide and vapor are generated as by-products of the reactions. Carbon dioxide and vapor remaining in a fuel cell inhibit the expected chemical reactions in the fuel cell, thereby deteriorating the efficiency of the fuel cell. Therefore, carbon dioxide and vapor should be removed immediately after being produced. The carbon dioxide and vapor generated in the fuel cell flow in the channels and are discharged from a side of the sheets through the channels. The reduced widths of the superposed channels in lower positions may prevent carbon dioxide and vapor from flowing deeply into a lower part of the fuel cell. Rather, most of the carbon dioxide and vapor is discharged through the channels of the uppermost sheet. Although some of the carbon dioxide and vapor may flow downward through the superposed channels, the carbon dioxide and vapor are discharged to the outside through the channels into which they flow. Therefore, the carbon dioxide and vapor are not introduced into the wick structured plate to be mixed with the liquid fuel.

The pattern parts 321, 322, 323, 324, 325 of the respective sheets of FIGS. 4A through 4E are superposed on each other to form a mesh type pattern. Since the first directional linear pattern and the second directional linear pattern are superposed while being adjacent to each other, the pattern parts form a structure having the first directional linear pattern and the second directional linear pattern crossing each other to be tangled, i.e., a mesh.

The region where the pattern parts 321, 322, 323, 324, 325 are superposed on each other may act like a porous medium. The mesh structure formed by the intersection of the pattern parts 321, 322, 323, 324, 325 has a number of micro-holes. Through these holes, the liquid fuel stored in the wick structured plate disposed below may be transferred in an upward direction by capillary suction. Therefore, the region of the superposed pattern parts 321, 322, 323, 324, 325 of the sheet stack may act as a passage to transfer the fuel in an upward direction while the region of the superposed channels 331, 332, 333, 334, 335 of the sheet stack may act as a passage to discharge by-products of the chemical reaction to outside of the fuel cell.

The first directional linear pattern and the second directional linear pattern shown in FIGS. 4A through 4E are formed with a horizontal direction being perpendicular to the fuel inlets of the respective sheets and a vertical direction being parallel to the fuel inlets of the respective sheets. Alternately, the first directional linear pattern and the second directional linear pattern may be formed in a direction parallel to diagonal lines of the respective sheets while being at right angles to each other.

The respective sheets may be prepared by forming a base substrate of a metal or plastic material and coating a hydrophilic material thereon to form pattern parts, channels and fuel inlets. The formation of the pattern parts, channels and fuel inlets may be performed by following a known method such as metal etching, etching, etc.

Figure 5:
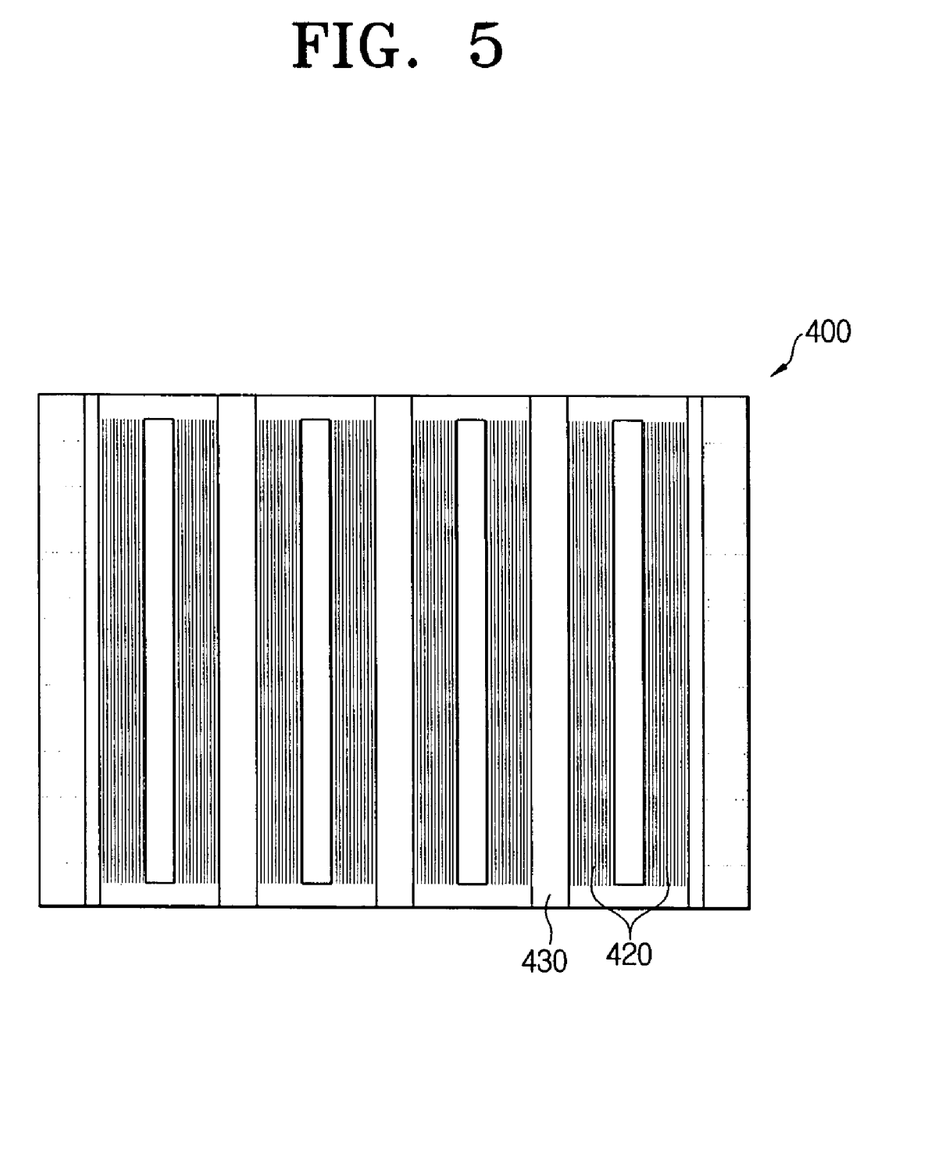
FIG. 5 illustrates a plan view showing an electrode plate of FIG. 2B.

FIG. 5 illustrates a plan view of the electrode plate 400 of FIGS. 2B and 2C. The electrode plate 400 includes pattern parts 420 formed at positions superposed on pattern parts (not shown) of an uppermost sheet (not shown) of a sheet stack (not shown) formed below the electrode plate 400, and channels 430 formed at positions superposed on channels of the uppermost sheet of the sheet stack formed below. Since a wall (not shown) may be formed at positions corresponding to fuel inlets (not shown) of the uppermost sheet disposed below, flow of liquid fuel may be partially intercepted. A linear pattern of the pattern parts 420 may be perpendicular to a linear pattern of the pattern parts of the uppermost sheet below. An area of the pattern parts 420 may be smaller than that of the pattern parts of the uppermost sheet. However, a width of the channel 430 may be larger than that of the channel of the uppermost sheet disposed below. Thus, a direction of the linear pattern of the pattern parts 420, the area of the pattern parts 420, and the width of the channel 430 in the electrode plate 400 may be determined by the directions of the linear patterns of the pattern parts, the areas of the pattern parts, and the widths of the channels of the underlying sheets of the sheet stack, respectively.

Figure 6:
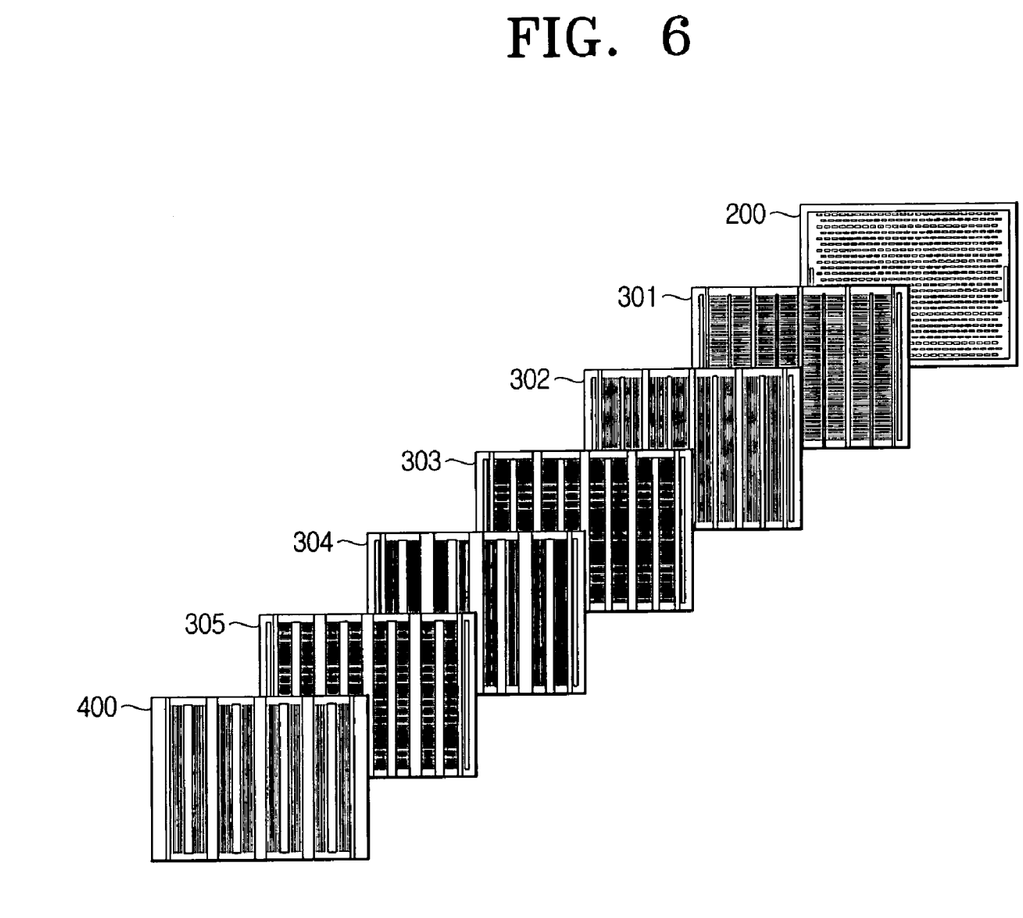
FIG. 6 illustrates a plan view showing a sequential disposition of components shown in FIGS. 3 through 5.

FIG. 6 illustrates a plan view showing the wick structured plate 200, the plurality of sheets 301, 302, 303, 304, 305 and the electrode plate 400 of FIGS. 3 through 5, which are sequentially disposed. Such a structure including the above components disposed sequentially, along with a fuel tank formed therebelow, is provided as a fuel supply device.

Figure 7:
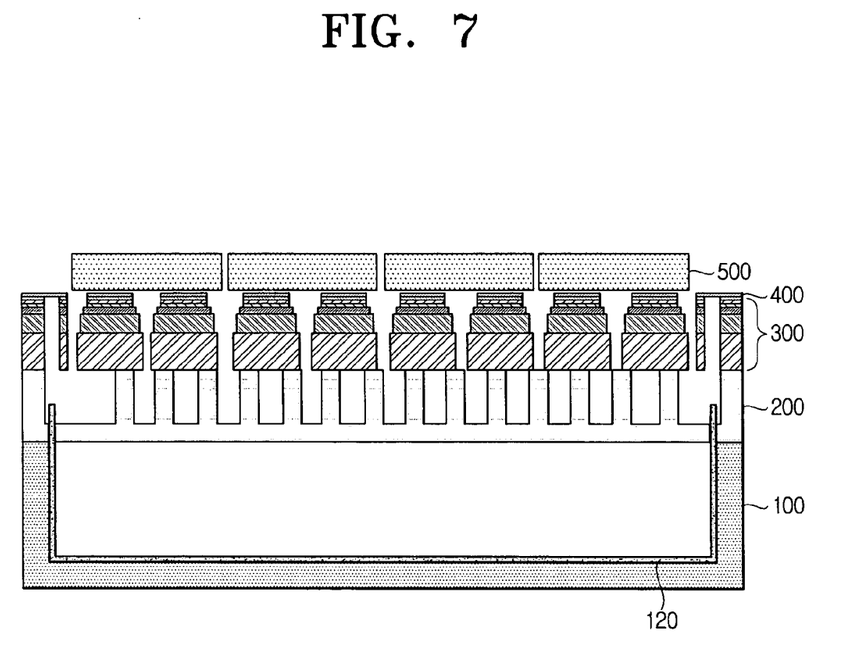
FIG. 7 shows the fuel supply device of FIG. 2B with fuel cells 500 attached thereon.

FIG. 7 illustrates a cross-section of a structure including the fuel supply device of FIG. 2B with fuel cells 500 formed thereon.

The exemplary operation of a fuel cell and fuel supply device according to the present invention will now be continued with respect to FIG. 7. Liquid fuel stored in the fuel tank 100 is transferred to the wick structured plate 200 disposed thereon through the porous medium 120. The liquid fuel is uniformly spread throughout the wick structured plate 200. Thereafter, the liquid fuel is supplied by capillary force to the fuel cells 500 disposed on the wick structured plate 200 through the pattern part regions of the sheet stack 300 and the electrode plate 400 formed on the wick structured plate 200.

Carbon dioxide and vapor are generated as by-products of chemical reactions using the supplied liquid fuel in the fuel cells 500 and are discharged to the outside through channels of the electrode plate 400 and the sheet stack 300 sequentially disposed under the fuel cells 500.

As described above, by providing a fuel supply device including a sheet stack having a mesh structure formed of a wick structured plate and pattern parts, according to an embodiment of the present invention, it may be possible to continuously and uniformly supply liquid fuel in a proper amount, and to therefore carry a fuel cell using the fuel supply device for a long period of time. Also, it may be possible by the present invention to effectively remove by-products generated in the fuel cell, thereby improving the efficiency of the fuel cell.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A fuel supply device for direct methanol fuel cells, comprising:
   a wick structure configured to transfer liquid fuel from a fuel tank to a sheet stack disposed on the wick structure; and
   an electrode plate disposed on the sheet stack, the electrode plate configured to transfer fuel from the sheet stack to a fuel cell having an anode and a cathode, and configured to transfer gaseous reaction products from the anode and/or cathode to the sheet stack, wherein:
   the sheet stack includes at least two stacked sheets,
   each sheet includes pattern parts having a longitudinal dimension and further includes channels parallel to the longitudinal dimension of the pattern parts,
   the pattern parts include a linear pattern, and
   directions of overlapping linear patterns of adjacent sheets cross each other.

2. The fuel supply device as claimed in claim 1, wherein:
   the wick structure is configured to extend across an opening in the fuel tank, and
   the fuel tank is capable of being attached to and detached from the wick structure.

3. The fuel supply device as claimed in claim 2, further comprising the fuel tank, wherein the fuel tank includes a fuel tank body and a porous medium.

4. The fuel supply device as claimed in claim 3, wherein the porous medium is disposed inside the fuel tank body and extends beyond the fuel tank body.

5. The fuel supply device as claimed in claim 1, wherein the wick structure comprises a wick structured plate having a plurality of wicks and fuel supply ports.

6. The fuel supply device as claimed in claim 5, further comprising the fuel tank, wherein the fuel tank includes a fuel tank body and a porous medium.

7. The fuel supply device as claimed in claim 6, wherein the porous medium is disposed corresponding to the fuel supply ports.

8. The fuel supply device as claimed in claim 5, wherein the wicks are arranged in at least two parallel horizontal rows.

9. The fuel supply device as claimed in claim 8, wherein wicks in a first one of the at least two parallel horizontal rows are staggered with respect to wicks in a second one of the at least two parallel horizontal rows.

10. The fuel supply device as claimed in claim 5, wherein the plurality of wicks is arranged radially outward from a center of the wick structured plate.

11. The fuel supply device as claimed in claim 5, wherein:
    the wick structured plate further includes a wall along edges thereof,
    the wall extends from a fuel tank side of the wick structured plate to the sheet stack, and
    the sheet stack is between the wall and the electrode plate.

12. The fuel supply device as claimed in claim 1, wherein the pattern parts and channels of a first sheet are respectively superposed on the pattern parts and channels of an adjacent second sheet sheets, the superposed channels defining an opening that penetrates the first sheet and the second sheet.

13. The fuel supply device as claimed in claim 1, wherein the channels of each sheet have at least one side open to an outside atmosphere so as to discharge the gaseous reaction products out of the sheet.

14. The fuel supply device as claimed in claim 1, wherein:
areas of the pattern parts decrease in sheets disposed increasingly further from the wick structure, and
widths of the channels increase in sheets disposed increasingly further from the wick structure.

15. The fuel supply device as claimed in claim 1, wherein the electrode plate comprises pattern parts and channels respectively formed at positions superposed on pattern parts and channels of an uppermost sheet of the sheet stack disposed therebelow, wherein a linear pattern of the pattern parts of the electrode plate corresponds to the linear pattern of a second uppermost sheet of the sheet stack.

16. The fuel supply device as claimed in claim 1, wherein a mesh structure is defined in the sheet stack by the pattern parts of the sheets, the liquid fuel being transferred from the wick structure to the electrode plate through the mesh structure.

17. The fuel supply device as claimed in claim 16, wherein the mesh structure has micro-holes.

18. The fuel supply device as claimed in claim 1, wherein the wick structure includes a plurality of fuel supply ports, and each sheet of the sheet stack further includes fuel inlets formed at positions corresponding to the fuel supply ports of the wick structure.

* * * * *